May 13, 1947.   B. D. BARTON   2,420,515
PRESSURE GOVERNOR CONTROL MECHANISM
Filed Nov. 15, 1943
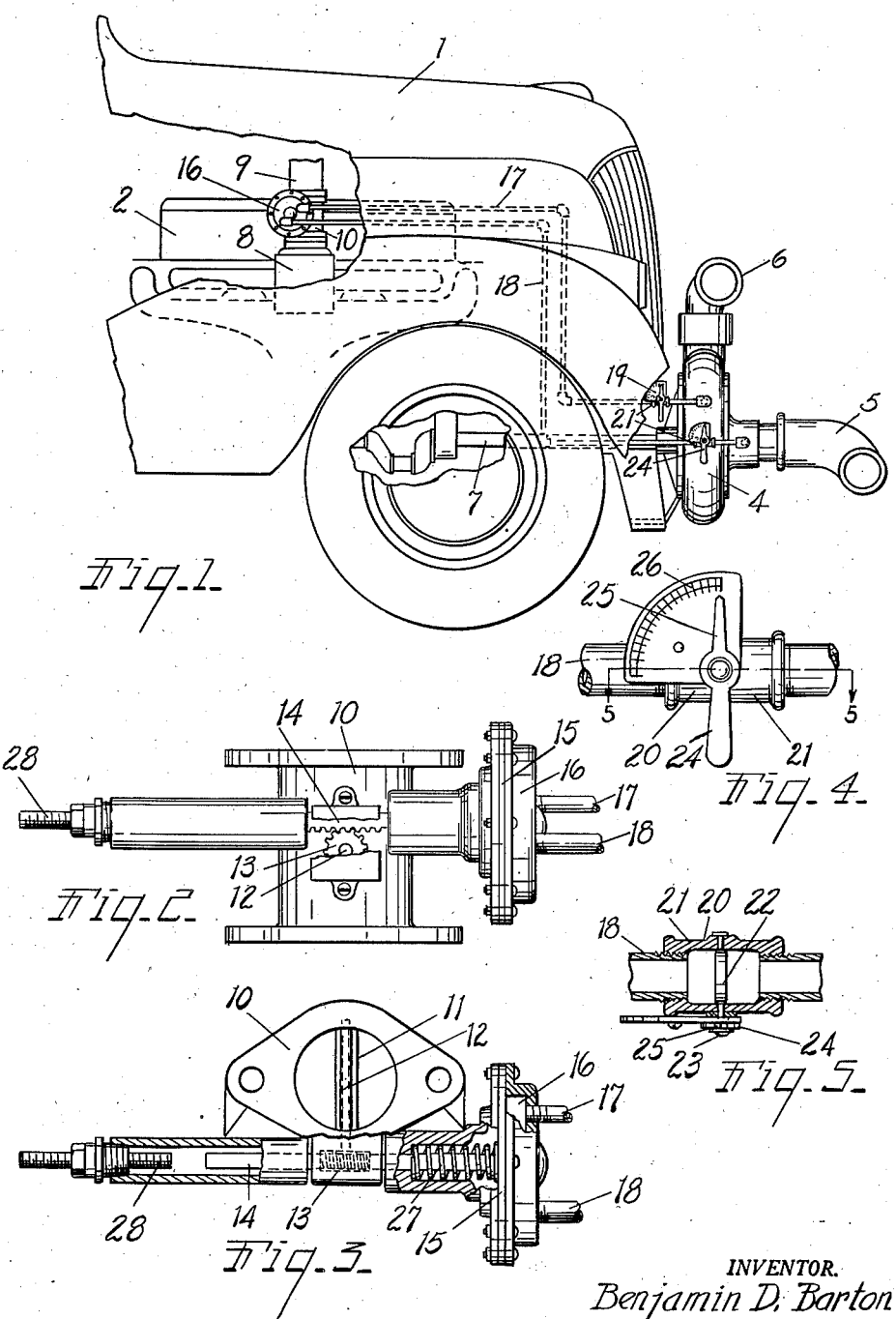
INVENTOR.
Benjamin D. Barton
BY
Earl & Chappell
ATTORNEYS.

Patented May 13, 1947

2,420,515

UNITED STATES PATENT OFFICE 2,420,515

PRESSURE GOVERNOR CONTROL MECHANISM

Benjamin D. Barton, Battle Creek, Mich., assignor to American-Marsh Pumps, Inc., Battle Creek, Mich.

Application November 15, 1943, Serial No. 510,318

16 Claims. (Cl. 103—16)

This invention relates to improvements in pressure governor control mechanism.

The main objects of this invention are:

First, to provide a governor for pumps operated or controlled by the pressure of the pumped fluid.

Second, to provide a control mechanism for pumps in which the speed of the prime mover, such as an internal combustion engine, is easily controlled to drive the pump for maintaining a desired delivery pressure.

Third, to provide a structure capable of accomplishing these objects which may be readily adapted to types of pumping apparatus now in extended use.

Objects pertaining to details and economies of the invention will definitely appear from the description to follow. The invention is defined in the claims.

A structure which embodies the features of the invention is illustrated in the accompanying drawing, in which:

Fig. 1 is a fragmentary side elevation of a motor vehicle equipped with my invention, the motor power being an internal combustion engine. Various parts are shown conventionally.

Fig. 2 is an enlarged fragmentary side elevation of parts of the governor control as embodied in the internal combustion engine.

Fig. 3 is a fragmentary view partially in horizontal section of the parts shown in Fig. 2.

Fig. 4 is an enlarged fragmentary elevation of the regulating valve.

Fig. 5 is a fragmentary view partially in section on line 5—5 of Fig. 4.

In the accompanying drawing 1 represents a motor vehicle and 2 the internal combustion engine thereof. A centrifugal pump 4 is mounted on the front of the motor vehicle, this being provided with an intake or suction connection 5 and a discharge 6. The pump is suitably connected to the engine, the crankshaft of which is shown at 7. The details of the connection are not illustrated, but it will be understood that they ordinarily include a clutch so that the pump may be connected or disconnected as desired. Since these details form no part of my present invention they are not illustrated.

The carburetor is indicated at 8 and the intake of the engine is indicated at 9. The throttle valve is not illustrated. I insert in this engine intake 9 a governor valve housing 10, preferably having a bore of the same gauge as the intake. Within this housing I mount the butterfly governor valve 11, the stem 12 of which is provided with a pinion 13. The rack 14 is reciprocatingly mounted to coact with the pinion and this rack is connected to the diaphragm 15 which is subject to the pressure within the pressure chamber 16. This pressure chamber is connected by the conduit 17 to the pressure or delivery side of the pump.

In the embodiment illustrated the pressure chamber is also connected by the conduit 18 to the suction or inlet connection of the pump, the conduit 18 constituting a return or exhaust connection to the pressure chamber. The conduit 18 is preferably larger than the conduit 17. In this embodiment the pressure connection 17 is provided with a regulating valve designated generally by the numeral 19, and the conduit 18 with a regulating valve designated generally by the numeral 20. It is not essential, however, to embody both valves in a single installation and either valve may be manipulated in manually regulating the pressure.

In Figs. 4 and 5 I illustrate a detail of the valve 20 which comprises the casing 21 in the form of a coupling adapted to be inserted in the conduit, the damper or butterfly type of valve 22 having its stem 23 projecting forwardly and provided with a handpiece 24 having a pointer 25 operatively associated with the indicia segment 26. The governor valve is urged to its open position shown in Fig. 3 by the spring 27 which also urges the diaphragm against the pressure within the pressure chamber 16. The adjustable stop 28 is provided to limit the closing movement of the valve 11.

With the parts thus arranged, the speed of the engine is controlled by the pressure generated by the pump, enabling maintenance of the desired pressure in the discharge of the pump without waste of fuel. I have illustrated the invention as adapted to a commercial truck having a centrifugal pump mounted thereon, such structures being quite widely used for fire engines and for pumping water from drains, excavations and the like.

It will be noted that in the embodiment illustrated the conduit or pipe 18 is of larger diameter than the conduit or pipe 17. This is a desirable feature as it insures against unwanted back pressure from the discharge, but a more important feature is that with the manually adjustable regulating valve 22, the pressure within the pressure chamber may be controlled, thereby controlling the governor valve, making it possible to use the valve 22 as a throttle valve for controlling the engine, in which case of course the regular throttle valve of the engine would be fully open. The spring 27 is of such strength or biasing capacity that it maintains the governor valve in its fully open position until the pressure within the pressure chamber rises above a predetermined degree. If this spring is biased at 120 pounds the governor valve remains in fully open position until the pressure within the pressure chamber exceeds 120 pounds and overcomes the spring, moving the governor valve toward closed position. It will be appreciated that the pressure within the chamber is controlled by regulating the inlet thereto or the outlet, preferably the outlet which, as stated, in the embodiment illustrated has a capacity exceeding that of the inlet. This regulating valve for the discharge provides very effective control.

In the embodiment illustrated the discharge of the pressure chamber is connected to the intake of the pump. This is a desirable feature as it prevents wasting water and also prevents discharge of water onto pavements and the like. Another advantage is that the regulating valve may be so adjusted that there is a continual flow of water through the conduits 17 and 18, thereby avoiding freezing. This adjustment can be made when the governor device is not in use, as it is not always desired to utilize the pressure regulating feature.

I have illustrated and described my invention in a very practical embodiment thereof. I have not attempted to illustrate other adaptations, such as to other types of prime movers, as it is believed this disclosure will enable the embodiment or adaptation of the invention as may be desired.

Having thus described my invention what I claim as new and desire to secure by Letters Patent is:

1. The combination with an internal combustion engine and a pump driven thereby, of a butterfly governor valve for the fuel intake of said engine, said valve being provided with a stem having a pinion thereon, a pressure chamber, a diaphragm subject to the pressure within said chamber, a rack reciprocatingly mounted to coact with said pinion and operatively connected to said diaphragm, a spring acting to urge the diaphragm against the pressure within said chamber and to urge said valve toward open position, an adjustable stop coacting with said rack for limiting the closing movement of said governor valve, a conduit connecting said pressure chamber to the pressure side of the pump, a return conduit connecting said pressure chamber to the intake of the pump, and a regulating valve in said return conduit.

2. The combination with an internal combustion engine and a pump driven thereby, of a governor valve for the fuel intake of said engine, said valve being provided with a stem having a pinion thereon, a pressure chamber, a diaphragm subject to the pressure within said chamber, a rack reciprocatingly mounted to coact with said pinion and operatively connected to said diaphragm, a spring acting to urge the diaphragm against the pressure within said chamber and to urge said valve toward open position, a conduit connecting said pressure chamber to the pressure side of the pump, a discharge for said pressure chamber, and a valve for regulating the flow of fluid through said pressure chamber.

3. The combination with an internal combustion engine and a pump driven thereby, of a fuel intake governor valve for said engine, a pressure chamber, a pressure actuated member subject to the pressure within said chamber operatively connected to said governor valve, means acting to urge said pressure actuated member against the pressure within said chamber and to urge said governor valve toward open position, a conduit connecting said pressure chamber to the pressure side of the pump, a return conduit connecting said pressure chamber to the intake side of the pump, and a flow regulating valve in said return conduit, said return conduit and said conduit permitting continuous flow of fluid therethrough during the operation of the pump whereby said flow regulating valve may regulate the pressure in said chamber and whereby freezing of the fluid in said conduit and return conduit is prevented.

4. The combination with an internal combustion engine and a pump driven thereby, of a fuel intake governor valve for said engine, a pressure chamber, a pressure actuated member subject to the pressure within said chamber operatively connected to said governor valve, means acting to urge said pressure actuated member against the pressure within said chamber and to urge said valve toward open position, a conduit connecting said pressure chamber to the pressure side of the pump, a discharge for said pressure chamber, and a regulating valve for regulating the flow of fluid from said pump to said pressure chamber, said conduit and discharge permitting continuous flow of fluid therethrough during the operation of the pump whereby said valve may regulate the pressure in said chamber and whereby freezing of the fluid in said connection and discharge is prevented.

5. The combination with an internal combustion engine and a pump driven thereby, of a governor valve for said engine, a pressure chamber, a movable pressure actuated member subject to the pressure within said pressure chamber and operatively connected to said governor valve, a spring acting to return said pressure actuated member and to urge said governor valve to open position, a connection for said pressure chamber to the pressure side of the pump, a return connection for said pressure chamber to the intake side of the pump, and a regulating valve for controlling the flow of fluid through said connections, said connection, and return connection permitting continuous flow of the fluid therethrough during operation of the pump whereby the flow regulating valve may control the pressure in said chamber and whereby freezing of the fluid in said connections is prevented.

6. The combination with an internal combustion engine and a pump driven thereby, of a governor valve for said engine, a pressure chamber, a movable member subject to the pressure within said pressure chamber and operatively connected to said governor valve, a spring acting to return said pressure actuated member and to urge said governor valve to open position, an adjustable stop for limiting the closing of said valve, a fluid connection for said pressure chamber to the pressure side of the pump, a regulating valve for controlling the flow of fluid to said pressure chamber, to control the pressure in the chamber, and a discharge permitting continuous flow of fluid through said chamber and fluid connection during the operation of the pump, whereby said flow regulating valve may control the pressure in said chamber.

7. The combination with an internal combustion engine and a pump driven thereby, of a governor valve for said engine, a pressure chamber, a movable member subject to the pressure within said pressure chamber and operatively connected to said governor valve, a spring acting to return said pressure actuated member and to urge said governor valve to open position, a fluid connection for said pressure chamber to the pressure side of the pump, and a return connection to the intake side of said pump to permit continuous flow of the fluid through said connections during the operation of the pump.

8. The combination with an internal combustion engine and a pump driven thereby, of a fuel intake governor valve for said engine, a pressure chamber having a fluid connection to the pressure side of the pump, a pressure actuated member operatively connected to said governor valve and subject to the variation in pressure within said chamber, means acting to urge said pressure actuated member against the pressure within said chamber and to urge said valve toward open position, an adjustable stop for limiting the closing movement of said governor valve, a manually adjustable regulating valve for regulating the flow of fluid from the pump to said pressure chamber, to control the pressure in the chamber, and a discharge permitting continuous flow of fluid through said chamber and fluid connection during the operation of the pump, whereby said flow regulating valve may control the pressure in said chamber.

9. The combination with an internal combustion engine and a pump driven thereby, of a fuel intake governor valve for said engine, a pressure chamber having a fluid connection to the pressure side of the pump, a pressure actuated member operatively connected to said governor valve and subject to the variation in pressure within said chamber, means acting to urge said pressure actuated member against the pressure within said chamber and to urge said valve toward open position, a manually adjustable regulating valve for regulating the flow of fluid from the pump to said pressure chamber, to control the pressure in the chamber, and a discharge permitting continuous flow of fluid through said chamber and fluid connection during the operation of the pump, whereby said flow regulating valve may control the pressure in said chamber.

10. The combination with an internal combustion engine and a pump driven thereby, of a fuel intake governor valve for said engine, a pressure chamber having a fluid connection to the pressure side of the pump, a pressure actuated member operatively connected to said governor valve and subject to the variation in pressure within said chamber, an adjustable stop for limiting the closing movement of said governor valve, a manually adjustable regulating valve for regulating the flow of fluid from the pump to said pressure chamber to control the pressure in said chamber, and a discharge permitting continuous flow of fluid through said fluid connection during the operation of the pump, whereby said flow regulating valve may control the pressure in said chamber.

11. The combination with an internal combustion engine and a pump driven thereby, of a fuel intake governor valve for said engine, a pressure chamber having a fluid connection to the pressure side of the pump, a pressure actuated member operatively connected to said governor valve and subject to the variation in pressure within said chamber, a manually adjustable regulating valve for regulating the flow of fluid from the pump to said pressure chamber to control the pressure in said chamber, and a discharge permitting continuous flow of fluid through said fluid connection during the operation of the pump, whereby said flow regulating valve may control the pressure in said chamber.

12. In a pressure control mechanism for fluid pumps, the combination with a fluid pump and a prime mover therefor, of means for governing the speed of said prime mover including a pressure chamber having fluid connection to the discharge side of the pump to receive fluid under pressure therefrom, a governor member operatively connected to the governing means for the prime mover and subject to variations in pressure within said pressure chamber to be actuated thereby, a return fluid connection for said pressure chamber to the intake side of the pump, and a manually adjustable regulating valve for regulating the flow of fluid from the pressure side of the pump to said pressure chamber, said fluid connections to and from said chamber permitting flow of the fluid therethrough during the operation of the pump whereby said adjustable flow regulating valve may control the pressure in said chamber.

13. In a pressure control mechanism for fluid pumps, the combination with a fluid pump and a prime mover therefor, of means for governing the speed of said prime mover including a pressure chamber having fluid connection to the discharge side of the pump to receive fluid under pressure therefrom, a governor member operatively connected to the governing means for the prime mover and subject to variations in pressure within said pressure chamber to be actuated thereby, a manually adjustable regulating valve for regulating the flow of fluid from the pressure side of the pump to said pressure chamber to control the pressure in said chamber, and a discharge permitting continuous flow of fluid through said fluid connection during the operation of the pump, whereby said flow regulating valve may control the pressure in said chamber.

14. The combination with an internal combustion engine and a pump driven thereby, of a fuel intake governor valve for said engine, a pressure chamber having a fluid connection to the pressure side of the pump, said pump having a discharge passageway for passage of fluid under pressure from the pump, said discharge passageway being separate from said fluid connection to permit flow of one portion of the fluid through said discharge passageway and another portion through said fluid connection and said pressure chamber, whereby the pressure in the pressure chamber is subject to only a portion of the flow of fluid from the pump, a pressure actuated member operatively associated with the governor valve and subject to the variations in pressure within the chamber, a spring acting to urge said governor valve to open position and said pressure actuated member against the pressure within the chamber, said spring being adapted to maintain the valve in open position until the pressure on the pressure actuated member exceeds a predetermined degree, a fluid discharge connection for said pressure chamber of a capacity exceeding that of the fluid connection to the pressure side of the pump, and a manually adjustable regulating valve for said discharge connection, said discharge connection permitting flow of fluid therethrough and also through said fluid connection during the operation of said pump.

15. The combination with an internal combustion engine and a pump driven thereby, of a fuel intake governor valve for said engine, a pressure chamber having a fluid connection to the pressure side of the pump, said pump having a discharge passageway for passage of fluid under pressure from the pump, said discharge passageway being separate from said fluid connection to permit flow of one portion of the fluid through said discharge passageway and another portion through said fluid connection and said pressure chamber, whereby the pressure in the pressure chamber is subject to only a portion of the flow of fluid from the pump, a pressure actuated member operatively associated with the governor valve and subject to the variations in pressure within the chamber, yielding means acting to urge said governor valve to open position and said pressure actuated member against the pressure within the chamber, said yielding means being adapted to maintain the valve in open position until the pressure on the pressure actuated member exceeds a predetermined degree, and a discharge for said pressure chamber provided with a regulating valve, said discharge permitting the flow of fluid therethrough and also through said fluid connection during the operation of the pump.

16. The combination with a fluid pump and a prime mover having driving connections thereto, of means for governing said prime mover including a pressure chamber having fluid connection to the pressure side of the pump, said pump having a discharge passageway for passage of fluid under pressure from the pump, said discharge passageway being separate from said fluid connection to permit flow of one portion of the fluid through said discharge passageway and another portion through said fluid connection and said pressure chamber, whereby the pressure in the pressure chamber is subject to only a portion of the flow of fluid from the pump, a governor member operatively connected to the governing means for said prime mover, a spring means acting to urge said governor member to its full predetermined speed position, and a discharge for said pressure chamber provided with a manually adjustable operating valve whereby the pressure within said pressure chamber may be regulated to thereby regulate the prime mover governing means, said discharge permitting the flow of fluid therethrough and also through said fluid connection during the operation of the pump.

BENJAMIN D. BARTON.

REFERENCES CITED

The following references are of record in the file of this patent:

UNITED STATES PATENTS

| Number | Name | Date |
|---|---|---|
| 1,966,356 | Ofeldt | July 10, 1934 |
| 2,126,863 | Barton | Aug. 16, 1938 |
| 1,057,909 | Wright | Apr. 1, 1913 |
| 1,536,697 | Wechsberg | May 5, 1925 |
| 882,085 | Warren | Mar. 17, 1908 |